(12) United States Patent
Killingbeck et al.

(10) Patent No.: US 9,752,709 B2
(45) Date of Patent: Sep. 5, 2017

(54) HYDRAULIC FITTING INSERT

(71) Applicant: Caterpillar Inc., Peoria, IL (US)

(72) Inventors: Jeremy Killingbeck, Greenwood, IN (US); Bruce Reynolds, Indianapolis, IN (US); James Atherton, Noblesville, IN (US); Joseph Louks, Greenwood, IN (US)

(73) Assignee: Catepillar Inc., Peoria, IL (US)

( * ) Notice: Subject to any disclaimer, the term of this patent is extended or adjusted under 35 U.S.C. 154(b) by 269 days.

(21) Appl. No.: 14/341,649

(22) Filed: Jul. 25, 2014

(65) Prior Publication Data
US 2016/0025247 A1 Jan. 28, 2016

(51) Int. Cl.
*F16L 15/04* (2006.01)
*F16L 15/00* (2006.01)

(52) U.S. Cl.
CPC ............ *F16L 15/04* (2013.01); *F16L 15/009* (2013.01)

(58) Field of Classification Search
CPC ....... F16L 15/04; F16L 15/004; F16L 15/007; F16L 15/009
USPC .................................................. 285/355, 390
See application file for complete search history.

(56) References Cited

U.S. PATENT DOCUMENTS

| | | | |
|---|---|---|---|
| 406,060 A * | 7/1889 | Potts | F16L 19/04 285/148.11 |
| 589,734 A * | 9/1897 | Lines | F16L 15/006 285/390 |
| 969,358 A * | 9/1910 | Goodall | F16L 27/12 285/148.23 |
| 2,671,949 A | 3/1954 | Welton | |
| 2,755,110 A | 7/1956 | Jacobs | |
| 3,104,899 A | 9/1963 | McKenzie | |
| 3,145,035 A | 8/1964 | Hanback | |
| 4,140,337 A * | 2/1979 | Arcella | F16L 41/10 285/219 |
| 4,153,983 A | 5/1979 | Stockton | |
| 4,708,038 A | 11/1987 | Hellnick et al. | |
| 4,974,880 A * | 12/1990 | Eggers | E21B 33/04 285/123.1 |
| 7,290,476 B1 | 11/2007 | Glasson | |
| 8,192,173 B2 | 6/2012 | Landrum et al. | |
| 2005/0099008 A1* | 5/2005 | Glover | F16L 25/14 285/357 |
| 2008/0116688 A1 | 5/2008 | Bull et al. | |
| 2012/0242081 A1 | 9/2012 | Keays et al. | |
| 2015/0048615 A1* | 2/2015 | Mammen | F16L 19/0218 285/357 |

FOREIGN PATENT DOCUMENTS

EP 1588015 A2 10/2005

\* cited by examiner

*Primary Examiner* — David E Bochna
*Assistant Examiner* — James A Linford

(57) ABSTRACT

A hydraulic system includes a housing having a housing bore defined by a bore inner surface, wherein the bore inner surface has an internal thread formed thereon and an insert having a flange formed adjacent a first end, a sealing feature formed adjacent a second end opposite the first end, and a cylindrical outer surface extending between the first end and the second end, the cylindrical outer surface having an external buttress thread configured to mesh with the internal thread of the housing bore. The sealing feature and the flange are configured to interface with the housing to provide a fluid seal.

16 Claims, 17 Drawing Sheets

HYDRAULIC FITTING INSERT

TECHNICAL FIELD

The disclosure relates generally to a fitting insert and, more particularly, to a threaded fitting insert for a hydraulic port associated with a hydraulic system associated with a machine.

BACKGROUND

Various housings associated with hydraulic systems in machines have hydraulic ports formed therein to allow passage of fluids. For example, a high pressure pump may be used to apply pressure to fluids such as fuel and oil. As a further example, threaded fittings may be machined to interface with the hydraulic ports. For example, U.S. Pat. No. 7,290,476 generally describes a fitting that is threaded into a hydraulic port. The fitting is hollow and facilitates flow of fluid through the hydraulic port.

However, over time, the threads in the housing may be stripped by the repeated installation and removal of the threaded fitting, preventing the re-use of the housing. Furthermore, repair of the threads of the housing may result in cracks or splits to the housing, as well as, fluid leakage between the fitting and port interface, especially under high pressure conditions (e.g., 5000 psi). For example, some repairs typically include the use of a heli-coil insert to repair the threads. This causes a higher percentage of the fittings to leak past an o-ring and/or result in the aforementioned housing failure. These and other shortcomings of the prior art are addressed by the disclosure.

SUMMARY

In one aspect, an insert includes a flange formed adjacent a first end, a sealing feature formed adjacent a second end opposite the first end, and a cylindrical outer surface extending between the first end and the second end. The cylindrical outer surface has an external buttress thread formed thereon.

In yet another aspect, a hydraulic system includes a housing having a housing bore defined by a bore inner surface. The bore inner surface has an internal thread formed thereon; and an insert having a flange formed adjacent a first end, a sealing feature formed adjacent a second end opposite the first end, and a cylindrical outer surface extending between the first end and the second end. The cylindrical outer surface has an external buttress thread configured to mesh with the internal thread of the housing bore, and the sealing feature and the flange are configured to interface with the housing to provide a fluid seal.

In yet another aspect, a method of providing a coupling interface for a fitting includes providing a housing having a housing bore defined by a bore inner surface and coupling an insert to the housing. The bore inner surface has an internal thread formed thereon. The insert has a flange formed adjacent a first end, a sealing feature formed adjacent a second end opposite the first end, and a cylindrical outer surface extending between the first end and the second end. The cylindrical outer surface has an external buttress thread. The external buttress thread meshes with the internal thread of the housing bore to facilitate a mechanical coupling. The sealing feature and the flange interface with the housing to provide a fluid seal.

DETAILED DESCRIPTION

Figure 1:
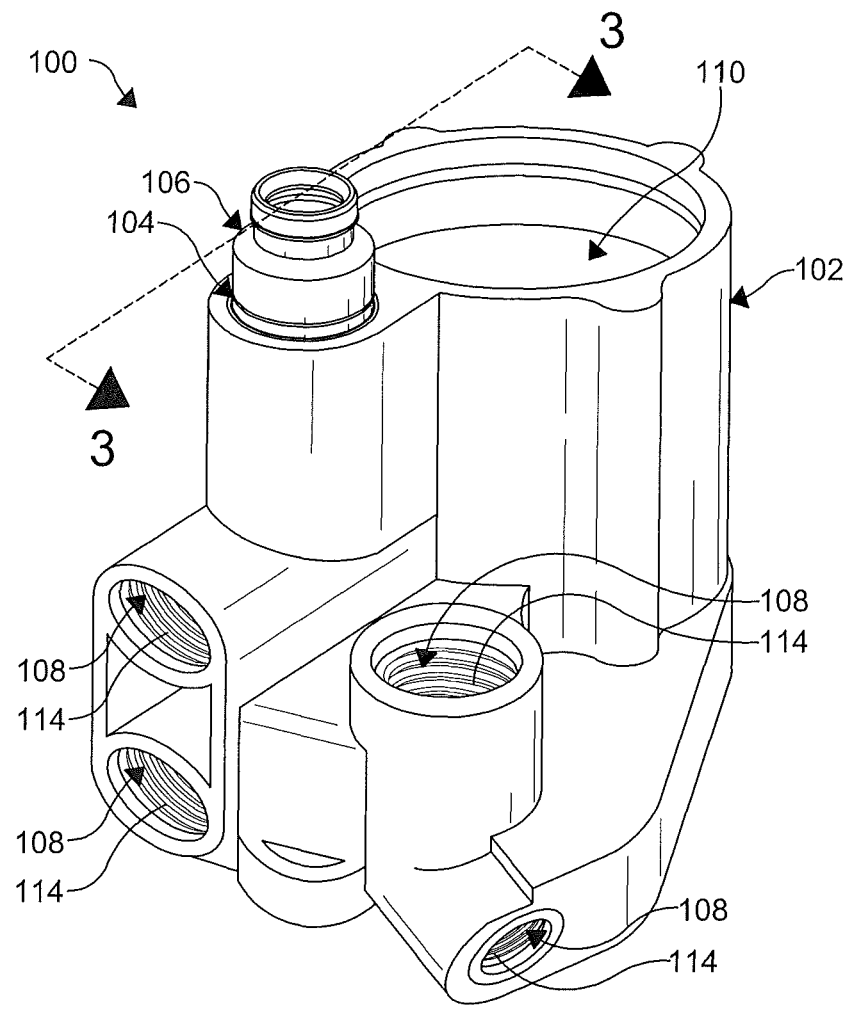
FIG. 1 is a perspective view of a hydraulic system that may be used to control the flow of fluid associated with a hydraulic system according to an aspect of the disclosure.

Now referring to the drawings, wherein like reference numbers refer to like elements, there is illustrated a hydraulic system 100 that may be used in association with a hydraulic system of a machine. For example a machine having an internal combustion engine adapted to combust a fuel to release the chemical energy therein and convert that energy to mechanical power. Such an internal combustion engine may be used to power the machine. The machine may be an "over-the-road" vehicle such as a truck used in transportation or may be any other type of machine that performs some type of operation associated with an industry such as mining, construction, farming, transportation, or any other industry known in the art. For example, the machine may be an off-highway truck, earth-moving machine, such as a wheel loader, excavator, dump truck, backhoe, motor grader, material handler or the like. The term "machine" may also refer to stationary equipment like a generator that is driven by an internal combustion engine to generate electricity. The hydraulic system may be any system utilizing fluid such as fuel, oil, hydraulic fluid, cooling fluid, transmission fluid, or the like.

Figure 2:
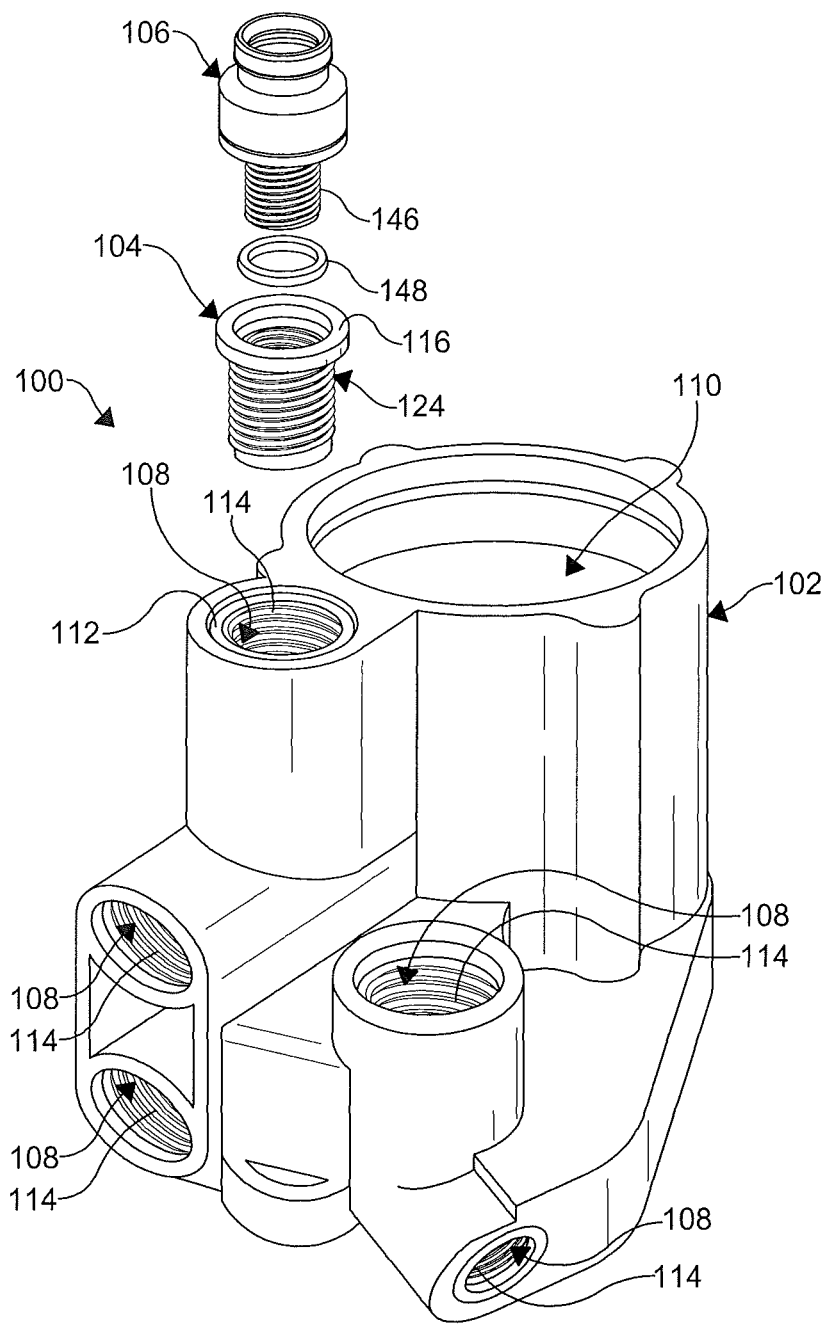
FIG. 2 is an exploded view of the hydraulic system of FIG. 1.
Figure 3:
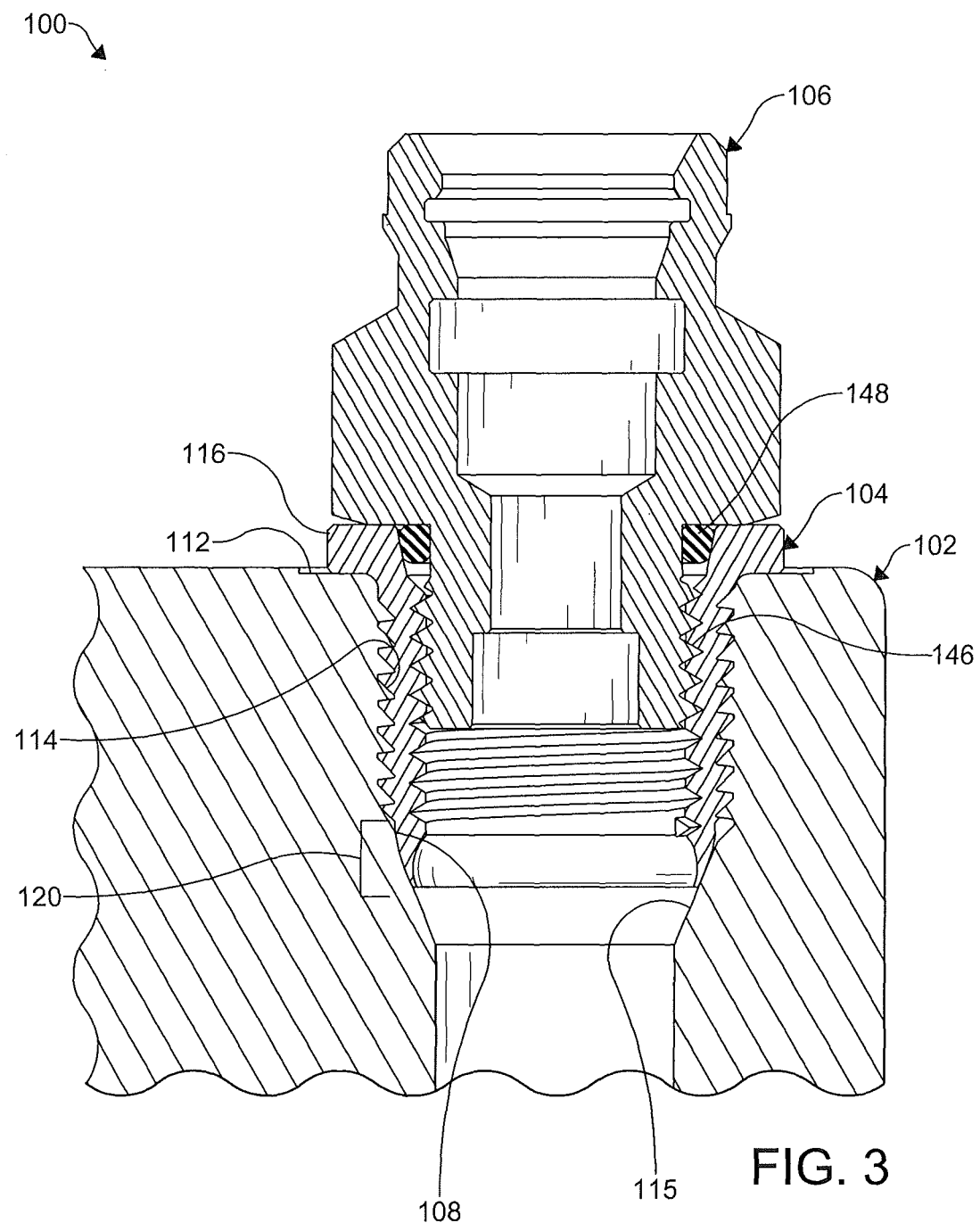
FIG. 3 is a partial cross-sectional view of the hydraulic system taken across line 3-3 of FIG. 1 and showing an insert having a compression interface formed on an end thereof according to an aspect of the disclosure.
Figure 4:
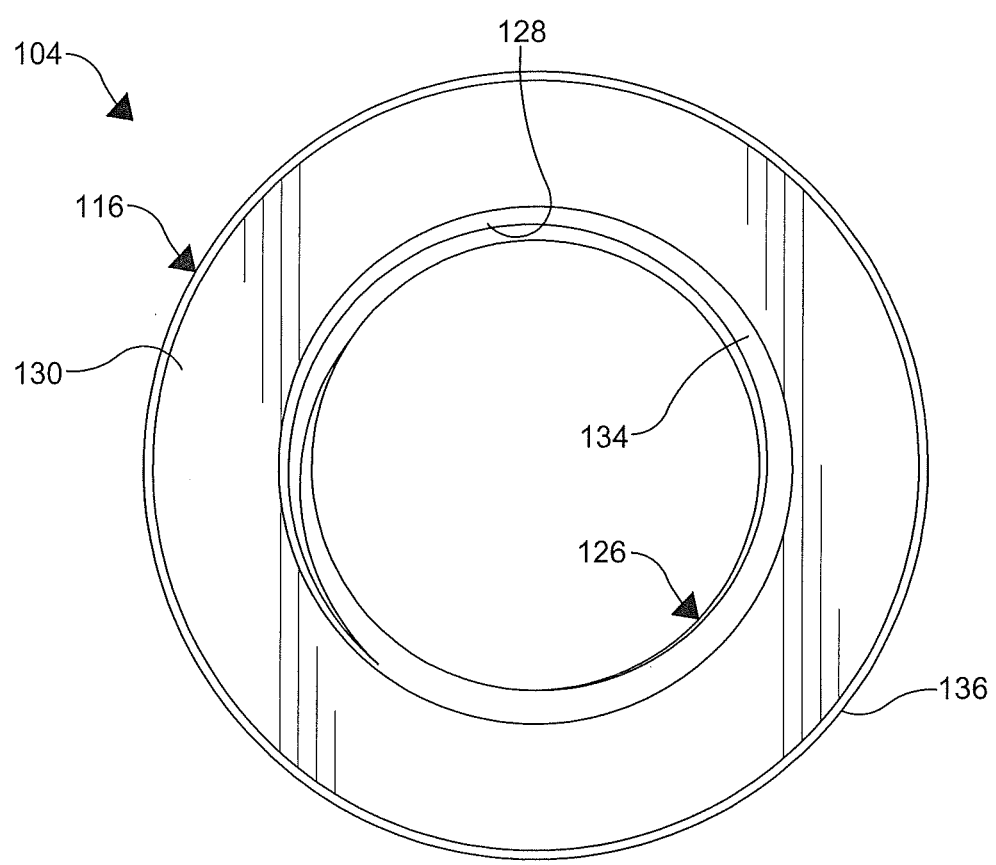
FIG. 4 is a top view of the insert of FIG. 3.
Figure 5:
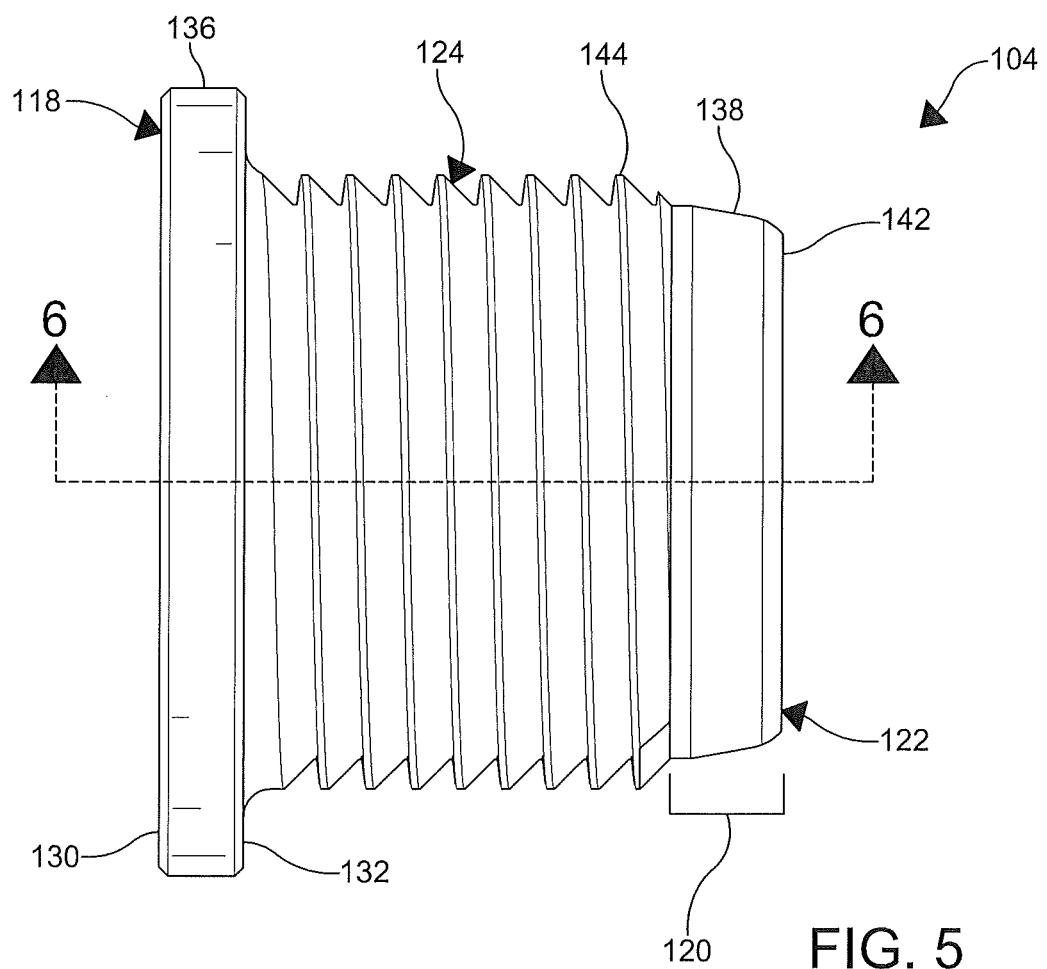
FIG. 5 is a side view of the insert of FIG. 3.
Figure 6:
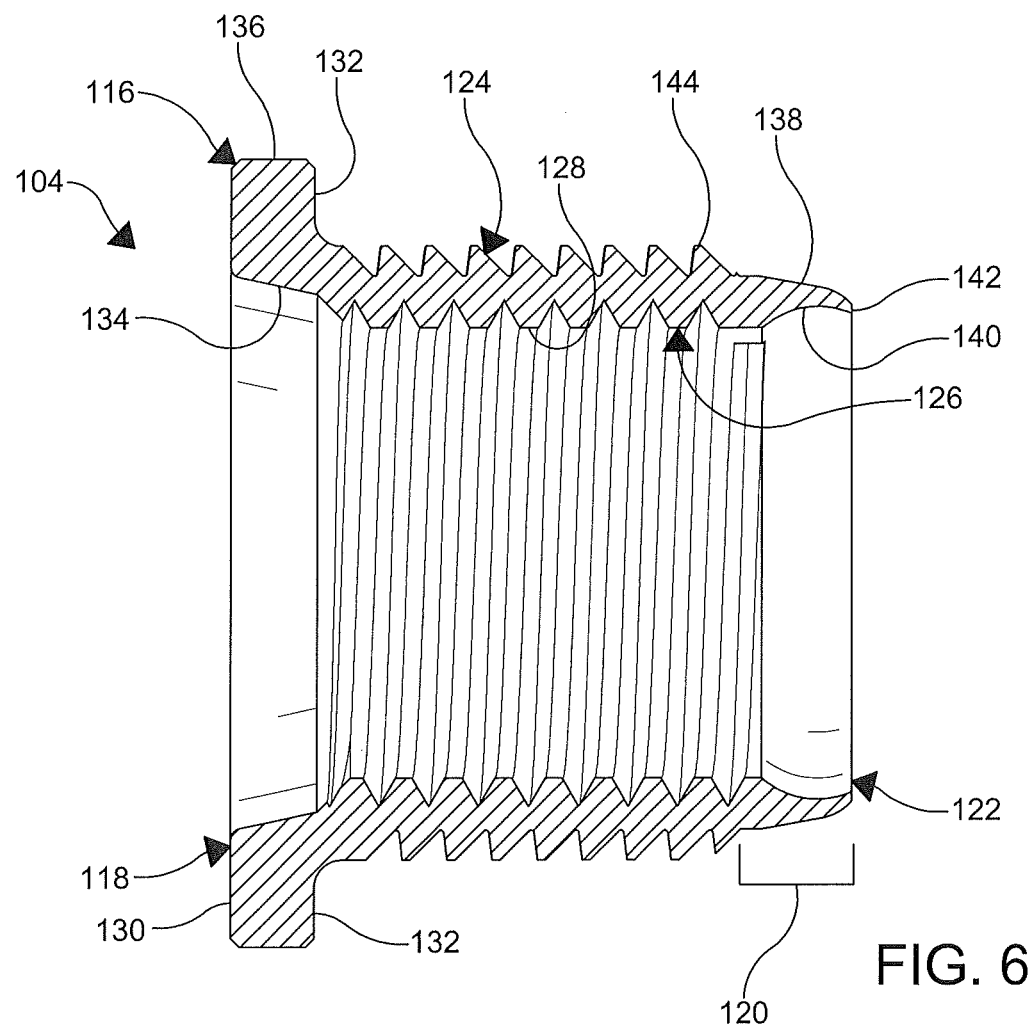
FIG. 6 is a cross-sectional view of the insert of FIG. 5 taken across line 6-6.
Figure 7:
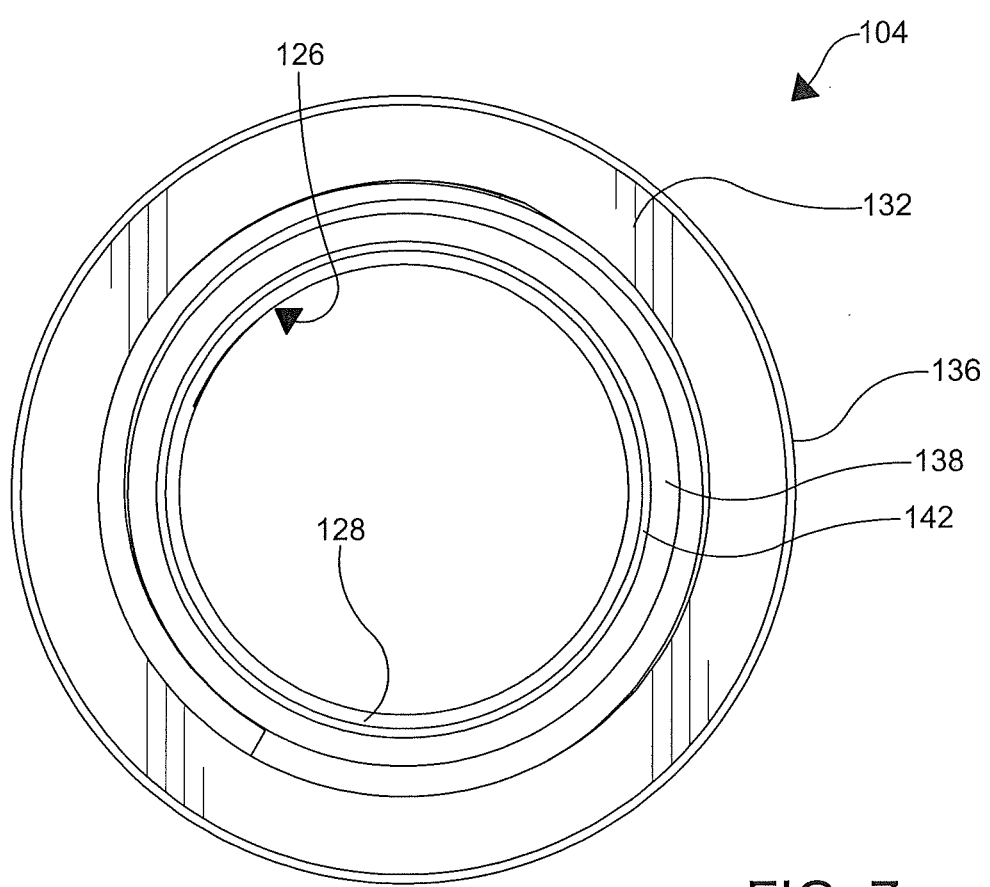
FIG. 7 is a bottom view of the insert of FIG. 3.

Referring to FIGS. 1-3, the hydraulic system 100 may include a housing 102, an insert 104, and a fitting 106. The hydraulic system 100 may include other components and configuration of components from what is illustrated in the figures. As an example, the hydraulic system 100 may be part of a high pressure pump such as a fuel pump. However, the hydraulic system may be other types of systems as defined herein. Moreover, the disclosure may be used with any component of a hydraulic system.

In an aspect, the housing 102 may include one or more housing bores (e.g., ports) defined by a bore inner surface 108. Such housing bores may facilitate the flow of fluid to and/or from an internal chamber 110 defined by the housing 102. The housing bores are shown having a generally cylindrically shape, however, other shapes and sizes may be used. A recessed shoulder 112 may be formed in the housing 102 adjacent an end of one or more of the housing bores. As an example, the recessed shoulder 112 may have an annular shape. As a further example, the recessed shoulder 112 may extend about a periphery of housing bore. The bore inner surface 108 of one or more of the housing bores may have an internal thread 114 formed thereon. An interior shoulder 115 may be formed in the bore inner surface 108. As an example, the interior shoulder 115 may be configured to interface with a portion of the insert 104 to form a fluid seal therebetween. As a further example, the interior shoulder 115 may be angled radially inwardly relative to the bore in order to cause a compression of at least a portion of the received insert 104. In an aspect, the housing may be formed from a low tensile material (e.g., material having a tensile strength under 45 kpsi such as 1050A aluminum, which has a tensile strength of about 11.6 kpsi). Other materials, such as higher tensile materials, are contemplated and may be used.

In an aspect, the insert 104 may extend much further into the housing 102 as compared to the fitting 106 as shown in FIG. 3. Additionally, the further extension of the insert 104 may result in locating the insert in a thicker portion of the housing. Locating the sealing portion of the insert deeper into the housing, where the housing has sufficient strength to resist the pressures without cracking and failing, allows the fitting function with minimized risk of housing failure. Once the seal is made in the deeper, stronger portion of the housing, then the insert will have sufficient strength to transmit the fluid through the weaker portion of the housing to the fitting.

Referring to FIGS. 3-7, the insert 104 may include a flange 116 formed adjacent a first end 118, a sealing feature 120 formed adjacent a second end 122 opposite the first end 118, and a cylindrical outer surface 124 extending between the first end 118 and the second end 122. In an aspect, the insert 104 has an insert bore defined by an inner surface 126. As an example, the inner surface 126 may have an internal thread 128 formed thereon. As a further example, the insert 104 may be formed from a high tensile material such as 1144 Stressproof steel with a tensile strength exceeding 100,000 psi (115 kpsi). Other materials are contemplated and may be used.

In an aspect, the flange 116 may have a top surface 130, a bottom surface 132, an inner surface 134 configured to receive the fitting, and an outer surface 136. The top surface 130 may be configured to interface with a portion of the fitting 106. The bottom surface 132 may be configured to interface with a portion of the housing 102. As an example, the bottom surface 132 may abut the recessed shoulder 112 formed in the housing 102 to operate as a depth stop. As a further example, the flange 116 may seat in the recessed shoulder 112 formed in the housing 102 such that the top surface 130 of the flange 116 is substantially flush with a portion of the housing 102. The inner surface 134 may define a flange bore as a portion of the insert bore and have the same or different inner diameter of the insert bore. As an example, the inner surface 134 may be an angled surface defining a varied inner diameter of the flange bore. As a further example, the inner surface 134 may terminate at the internal thread 128 formed on the inner surface 126 of the insert bore. The outer surface 136 may extend radially outwardly from insert bore. As an example, the outer surface 136 may extend beyond the cylindrical outer surface 124.

In an aspect, the sealing feature 120 may be a mechanical feature formed on the second end 122. As an example, the sealing feature 120 may include a compression interface defined by an annular ring having an outer curved surface 138, an inner curved surface 140, and a bottom interface surface 142. The outer curved surface 138 may have a radius of curvature that is the same or different from the radius of curvature of the inner curved surface 140. As an example, the outer curved surface 138 may have a radius of curvature that is less than the radius of curvature of the inner curved surface 140. The sealing feature 120 may be inwardly tapered relative to cylindrical outer surface 124. The outer curved surface 138 may be configured to abut a portion of the housing 102. As an example, the outer curved surface 138 may abut the interior shoulder 115 of the housing 102, while the insert 104 is disposed within the housing bore. As such, the outer curved surface 138 may be radially constricted to form a hydraulic seal with the interior shoulder 115 of the housing 102. As hydraulic pressure is introduced, the pressure pushes against the inner curved surface 140, intensifying the sealing effect.

In an aspect, the cylindrical outer surface 124 may include an external thread 144 formed thereon. As an example, the external thread 144 may be or include a buttress thread. Other threads may be used to minimize radially outward forces that could contribute to splitting the housing 102 and to produce optimal axial force. As a further example, the external thread 144 may be configured to mesh (e.g., engage) with the internal thread 114 of the housing bore.

Returning to FIGS. 1-3, the fitting 106 may be a hollow fitting to allow fluid to pass therethrough. The fitting 106 may have an external thread 146 configured to mesh with the internal thread 128 of the insert bore, while the fitting 106 is disposed within the insert bore. In an aspect, an annular seal 148 (e.g., O-ring) may be disposed between the fitting 106 and the insert 104 to provide a fluid seal therebetween. As an example, the annular seal 148 may be disposed adjacent the flange 116 of the insert 104. As a further example, the annular seal 148 may be disposed adjacent an inner surface 134 of the flange 116 of the insert 104. The internal portion of the insert 104 may comply with any standard fitting configuration, such as an SAE-6, or may comply with any unique design.

Referring to FIGS. 8-12, there is illustrated an aspect of a hydraulic system 200 including an insert 204 having a sealing feature 220. In an aspect, a housing 202 may include one or more housing bores (e.g., ports) defined by a bore inner surface 208. The housing bores are shown having a generally cylindrically shape, however, other shapes and sizes are contemplated and may be used. A recessed shoulder 212 may be formed in the housing 202 adjacent an end of one or more of the housing bores. As an example, the recessed shoulder 212 may have an annular shape. As a further example, the recessed shoulder 212 may extend about a periphery of the housing bore. The bore inner surface 208 of one or more of the housing bores may have an internal thread 214 formed thereon. An interior shoulder 215 may be formed in the bore inner surface 208. As an example, the interior shoulder 215 may be configured to interface with a portion of the insert 204 to form a fluid seal therebetween.

In an aspect, the insert 204 may include a flange 216 formed adjacent a first end 218, a sealing feature 220 formed adjacent a second end 222 opposite the first end 218, and a cylindrical outer surface 224 extending between the first end 218 and the second end 222. In an aspect, the insert 204 has an insert bore formed therethrough, the insert bore defined by an inner surface 226 having an internal thread 228 formed thereon. As an example, the insert 204 may be formed from a high tensile material. Other materials are contemplated and may be used.

In an aspect, the flange 216 may have a top surface 230, a bottom surface 232, an inner surface 234, and an outer surface 236. However, the flange 216 is not required since the depth of installation is determined by the torque of insertion, the tensile strength of the housing, and the tensile strength of the insert. The top surface 230 may be configured to interface with a portion of the fitting 106. The bottom surface 232 may be configured to interface with a portion of the housing 202. As an example, the bottom surface 232 may abut (e.g., contact) the recessed shoulder 212 formed in the housing 202. As a further example, the flange 216 may seat in the recessed shoulder 212 formed in the housing 202 such that the top surface 230 of the flange 216 is substantially flush with a portion of the housing 202. The inner surface 234 may define a flange bore as a portion of the insert bore and have the same or different inner diameter of the insert bore. As an example, the inner surface 234 may be an angled surface defining a varied inner diameter of the flange bore. As a further example, the inner surface 234 may terminate at the internal thread 228 formed on the inner surface 226 of the insert bore. The outer surface 236 may extend radially outwardly from insert bore. As an example, the outer surface 236 may extend beyond the cylindrical outer surface 224.

The sealing feature 220 may be a mechanical feature formed on a second end 222 of the insert 204. As an example, the sealing feature 220 may include a compression interface defined by a chiseled edge 250 formed in a bottom interface surface 242. The bottom interface surface 242 may be configured to abut a portion of the housing 202 such that the chiseled edge 250 embeds in the housing 202. As an example, the bottom interface surface 242 may abut the interior shoulder 215 of the housing 202, while the insert 204 is disposed within the housing bore. The chiseled edge 250 may have an annular shape or other shapes, patterns, sizes, angles, and configurations.

In an aspect, the cylindrical outer surface 224 may include an external thread 244 formed thereon. As an example, the external thread 244 may be or include a buttress thread. Other threads may be used to minimize radially outward forces that could contribute to splitting the housing 202 and to produce optimal axial force. As a further example, the external thread 244 may be configured to mesh with the internal thread 214 of the housing bore.

Figure 8:
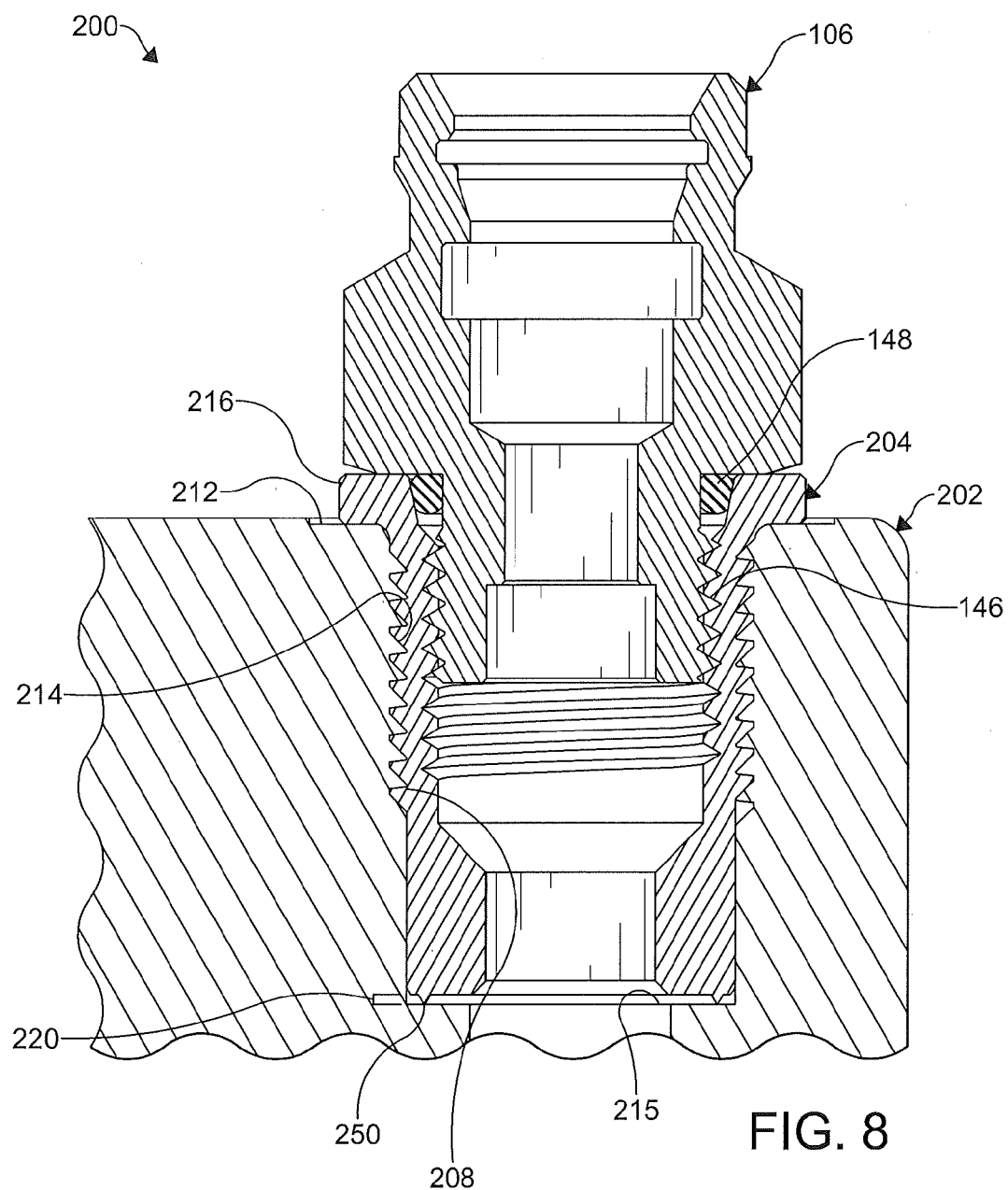
FIG. 8 is a cross-sectional view similar to FIG. 3 of the high pressure pump system showing an insert having a chiseled edge interface formed on an end thereof according to another aspect of the disclosure.
Figure 9:
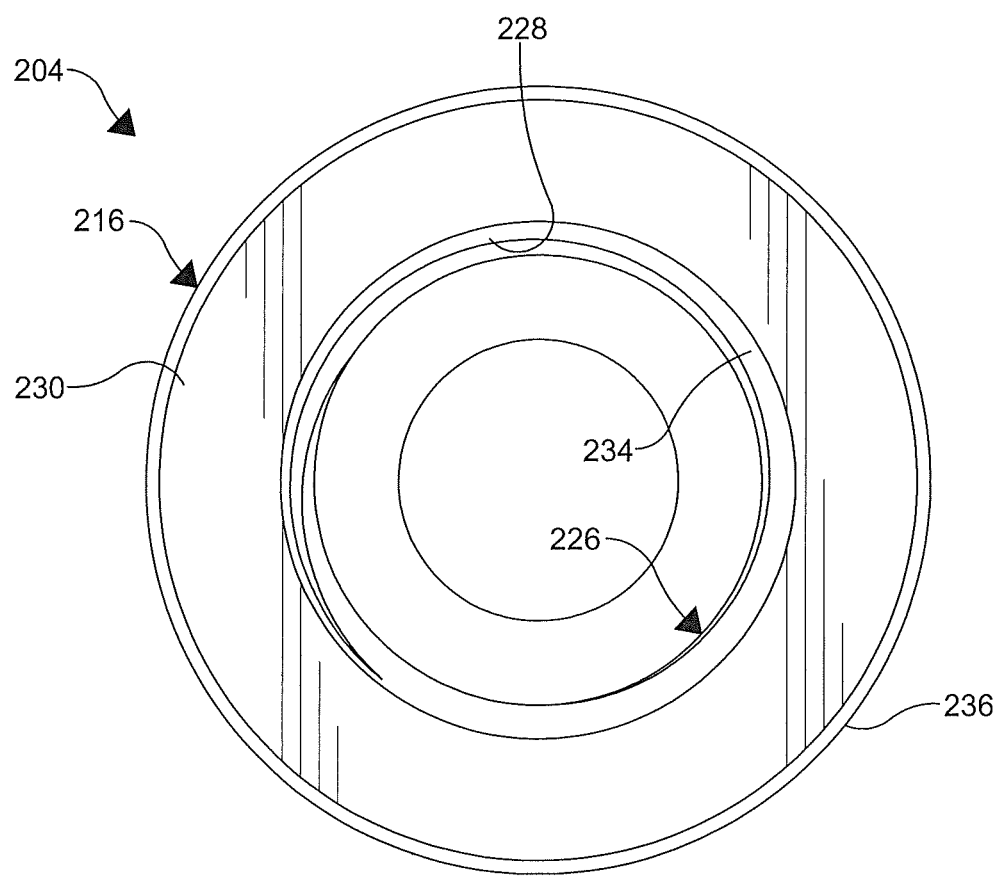
FIG. 9 is a top view of the insert of FIG. 8.
Figure 10:
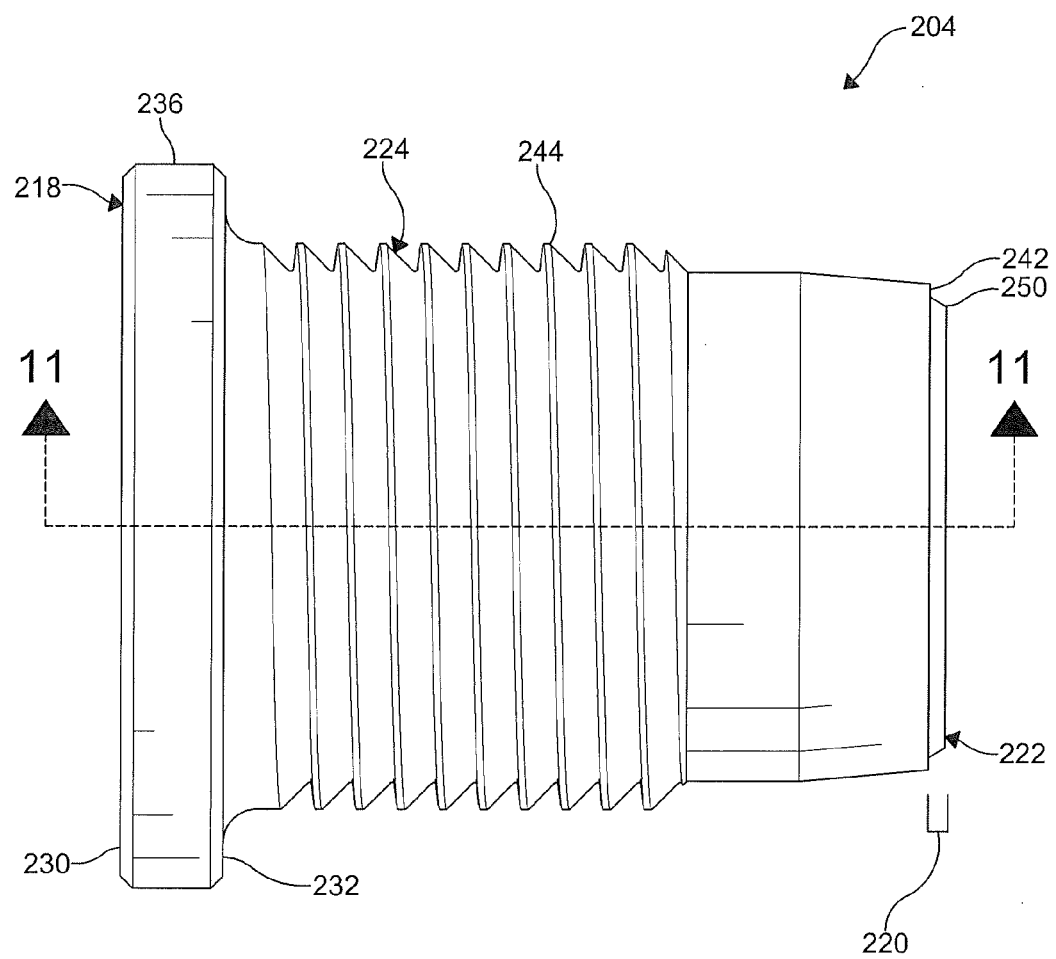
FIG. 10 is a side view of the insert of FIG. 8.
Figure 11:
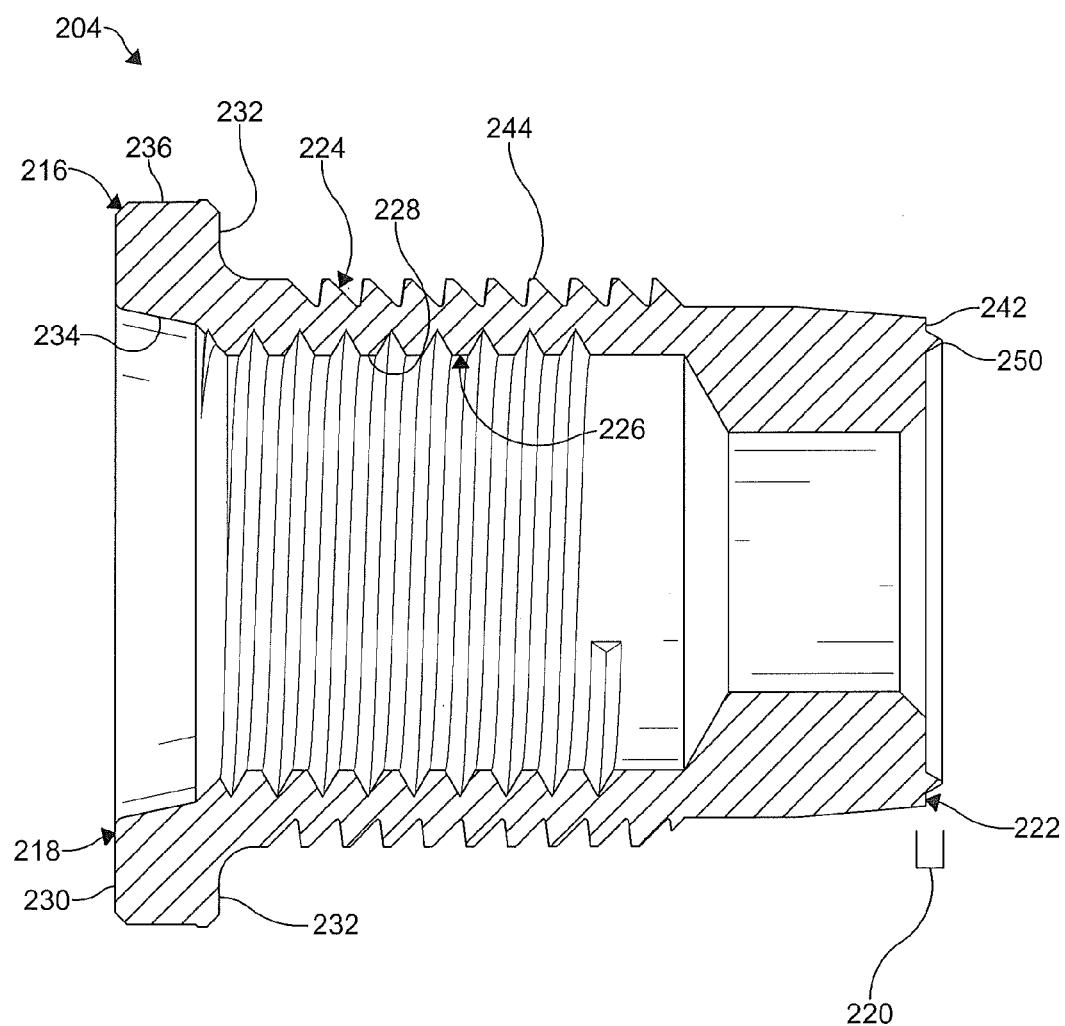
FIG. 11 is a cross-sectional view of the insert of FIG. 10 taken across line 11-11.
Figure 12:
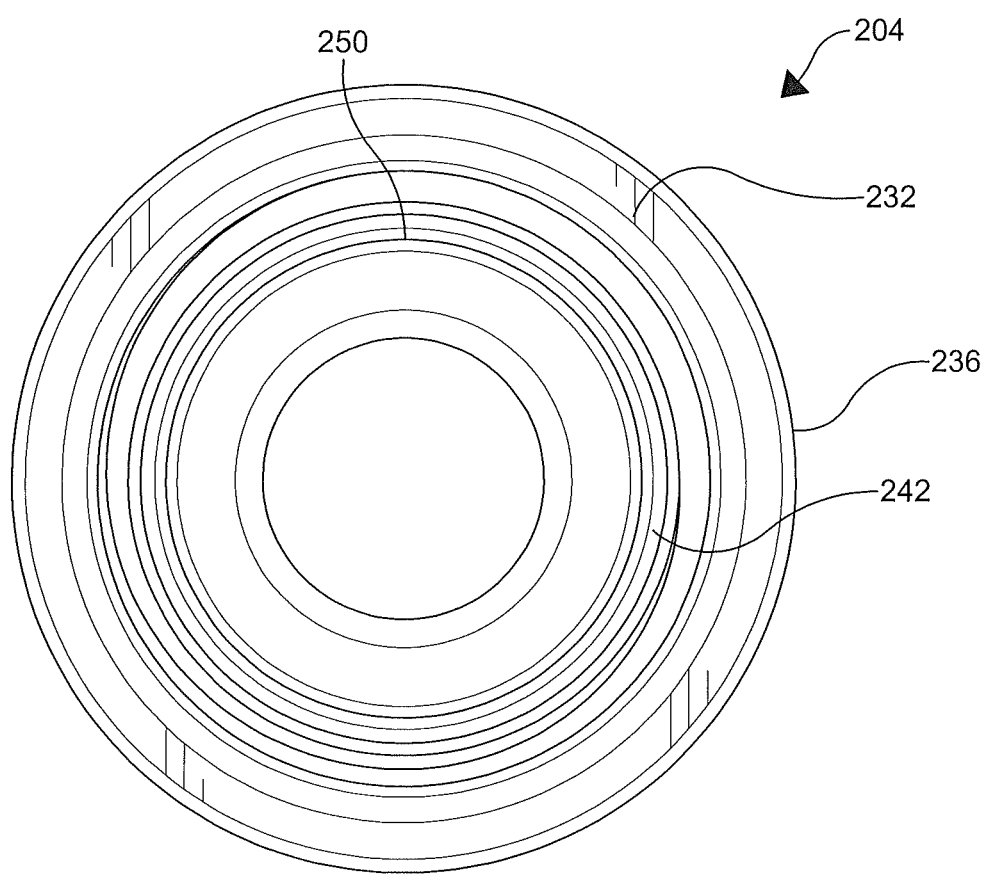
FIG. 12 is a bottom view of the insert of FIG. 8.

In an aspect, the insert 204 may extend much further into the housing 202 as compared to the fitting 106 as shown in FIG. 8. Additionally, the further extension of the insert 204 may result in locating the insert 204 in a thicker portion of the housing. Locating the sealing portion of the insert deeper into the housing, where the housing has sufficient strength to resist the pressures without cracking and failing, allows the fitting function with minimized risk of housing failure. Once the seal is made in the deeper, stronger portion of the housing, then the insert will have sufficient strength to transmit the fluid through the weaker portion of the housing to the fitting.

Referring to FIGS. 13-17, there is illustrated an aspect of a hydraulic system 300 including a housing 302 having a channel 350 and an insert 304 having a sealing feature 320. In an aspect, a hydraulic seal is effected by the interface between the channel 350 (e.g., a conical protrusion formed in the housing bore) and the sealing feature 320 (e.g., a conical receiver formed on the end of the insert 304). In an aspect, the housing 302 may include one or more ports or housing bores defined by a bore inner surface 308. The housing bores are shown having a generally cylindrically shape, however, other shapes and sizes may be used. A recessed shoulder 312 may be formed in the housing 302 adjacent an end of one or more of the housing bores. As an example, the recessed shoulder 312 may have an annular shape. As a further example, the recessed shoulder 312 may extend about a periphery of housing bore. The bore inner surface 308 of one or more of the housing bores may have an internal thread 314 formed thereon. An interior shoulder 315 may be formed in the bore inner surface 308. The channel 350 may be formed in the interior shoulder 315 and configured to receive the sealing feature 320 of the insert 304. The channel 350 may have any shape and configuration. When a taper lock seal is accomplished, a pressure may be applied radially outwardly relative to the housing bore. The channel 350 may abut a portion of the insert 304 to support the insert from such a radially outward force. As an example, the shape, angle, and/or taper of the channel 350 and the sealing feature 320 may not be the same. As such, the channel 350 and/or interior shoulder 315 may deform to conform to the angle of sealing feature 320 of the insert 304, making a secure seal. Hydraulic pressure pushing against the lower tensile housing 302 may cause the shoulder 315 to expand into the insert 304, intensifying the sealing effect.

In an aspect, the insert 304 may include a flange 316 formed adjacent a first end 318, a sealing feature 320 formed adjacent a second end 322 opposite the first end 318, and a cylindrical outer surface 324 extending between the first end 318 and the second end 322. In an aspect, the insert 304 has an insert bore defined by an inner surface 326. The inner surface 326 may have an internal thread 328 formed thereon. As an example, the insert 304 may be formed from a high tensile material. Other materials are contemplated and may be used.

In an aspect, the flange 316 may have a top surface 330, a bottom surface 332, an inner surface 334, and an outer surface 336. The top surface 330 may be configured to interface with a portion of the fitting 106. The bottom surface 332 may be configured to interface with a portion of the housing 302. As an example, the bottom surface 332 may abut the recessed shoulder 312 formed in the housing 302. As a further example, the flange 316 may seat in the recessed shoulder 312 formed in the housing 302 such that the top surface 330 of the flange 316 is substantially flush with a portion of the housing 302. The inner surface 334 may define a flange bore as a portion of the insert bore and have the same or different inner diameter of the insert bore. As an example, the inner surface 338 may be an angled surface defining a varied inner diameter of the flange bore. As a further example, the inner surface 334 may terminate at the internal thread 328 formed on the inner surface 326 of the insert bore. The outer surface 336 may extend radially outwardly from insert bore. As an example, the outer surface 336 may extend beyond the cylindrical outer surface 324.

The sealing feature 320 may be or comprise a mechanical feature formed on a second end 322 of the insert 304. As an example, the sealing feature 320 may include an annular ring configured to interface with the channel 350. The sealing feature 320 may include an inner surface 340 defining a sealing bore as a portion of the insert bore and having the same or different inner diameter of the insert bore. As an example, the inner surface 340 may be an angled surface defining a varied inner diameter of the sealing bore. As a further example, the inner surface 340 may abut a portion of the channel 350 to facilitate a fluid seal, while the insert 304 is disposed within the housing bore. The sealing feature 320 may include a bottom interface surface 342 configured to abut a portion of the housing 302 such as a portion of the channel 350, for example.

In an aspect, the cylindrical outer surface 324 may include an external thread 344 formed thereon. As an example, the external thread 344 may be or include a buttress thread. Other threads may be used to minimize radially outward forces that could contribute to splitting the housing 302 and to produce optimal axial force. As a further example, the external thread 344 may be configured to mesh with the internal thread 314 of the housing bore.

Figure 13:
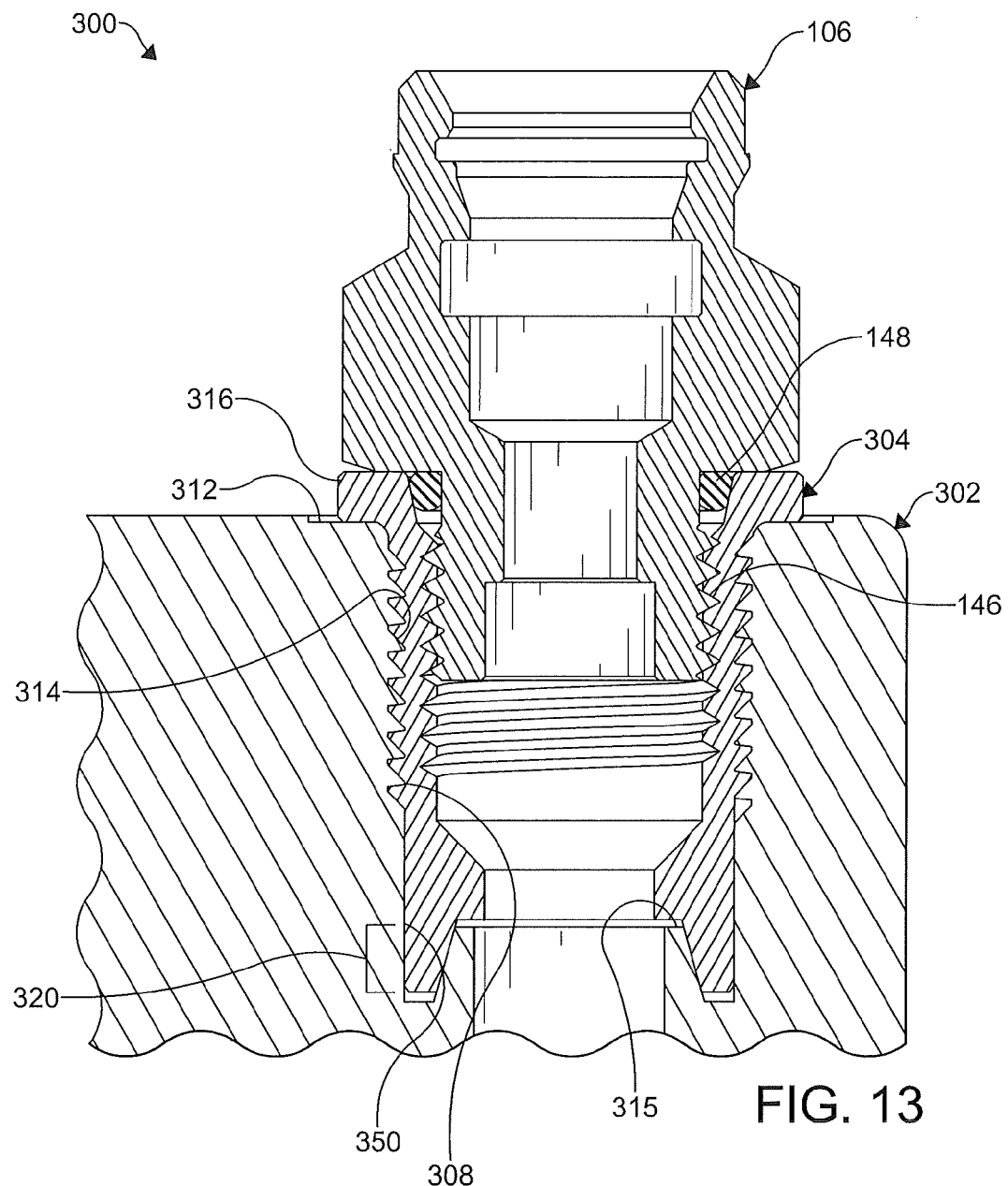
FIG. 13 is a cross-sectional view similar to FIG. 3 of the high pressure pump system showing an annular channel formed in the housing adapted to receive at least a portion of an insert according to yet another aspect of the disclosure.
Figure 14:
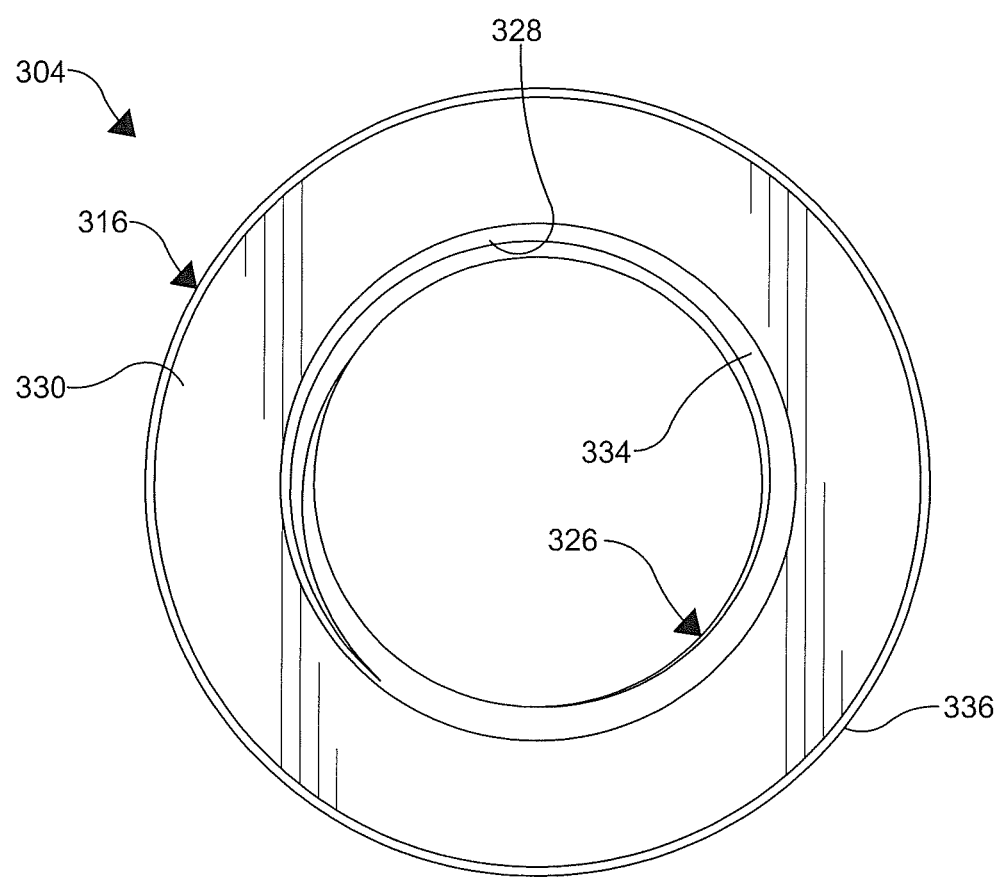
FIG. 14 is a top view of the insert of FIG. 13.
Figure 15:
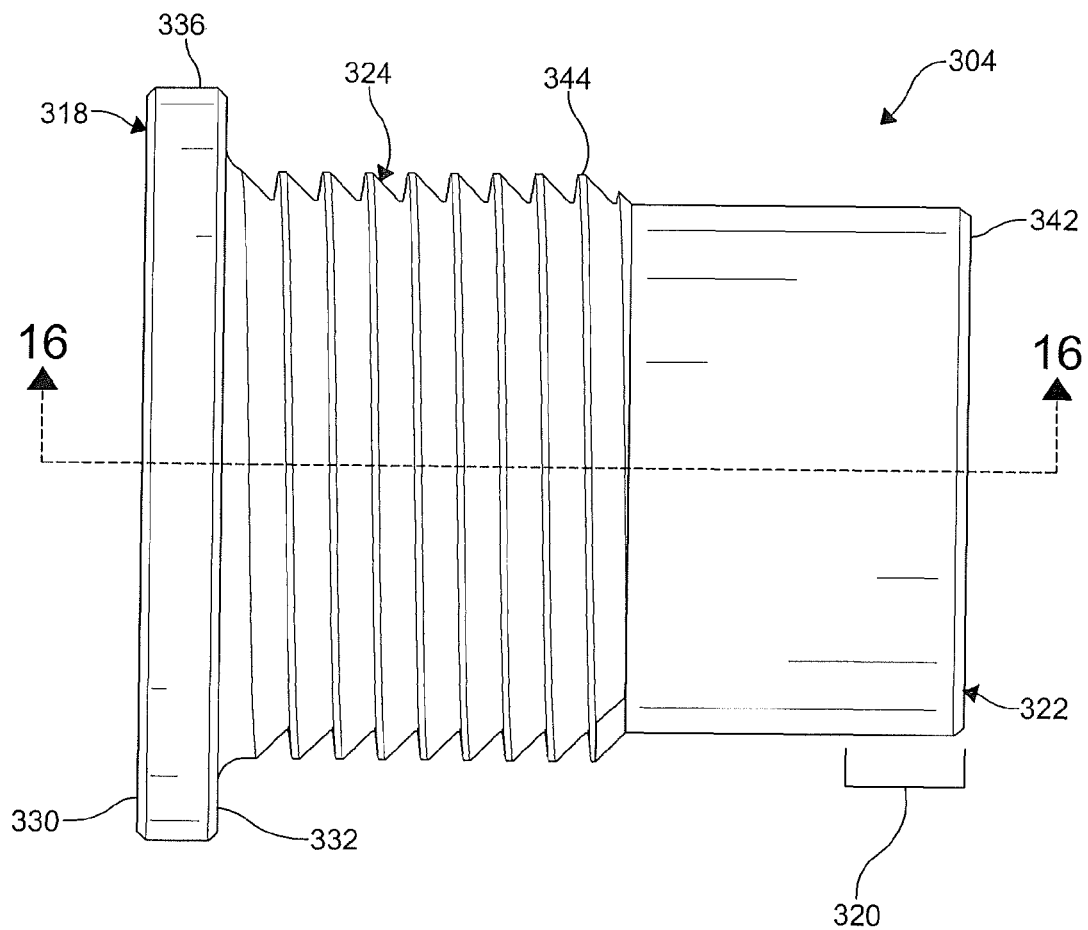
FIG. 15 is a side view of the insert of FIG. 13.
Figure 16:
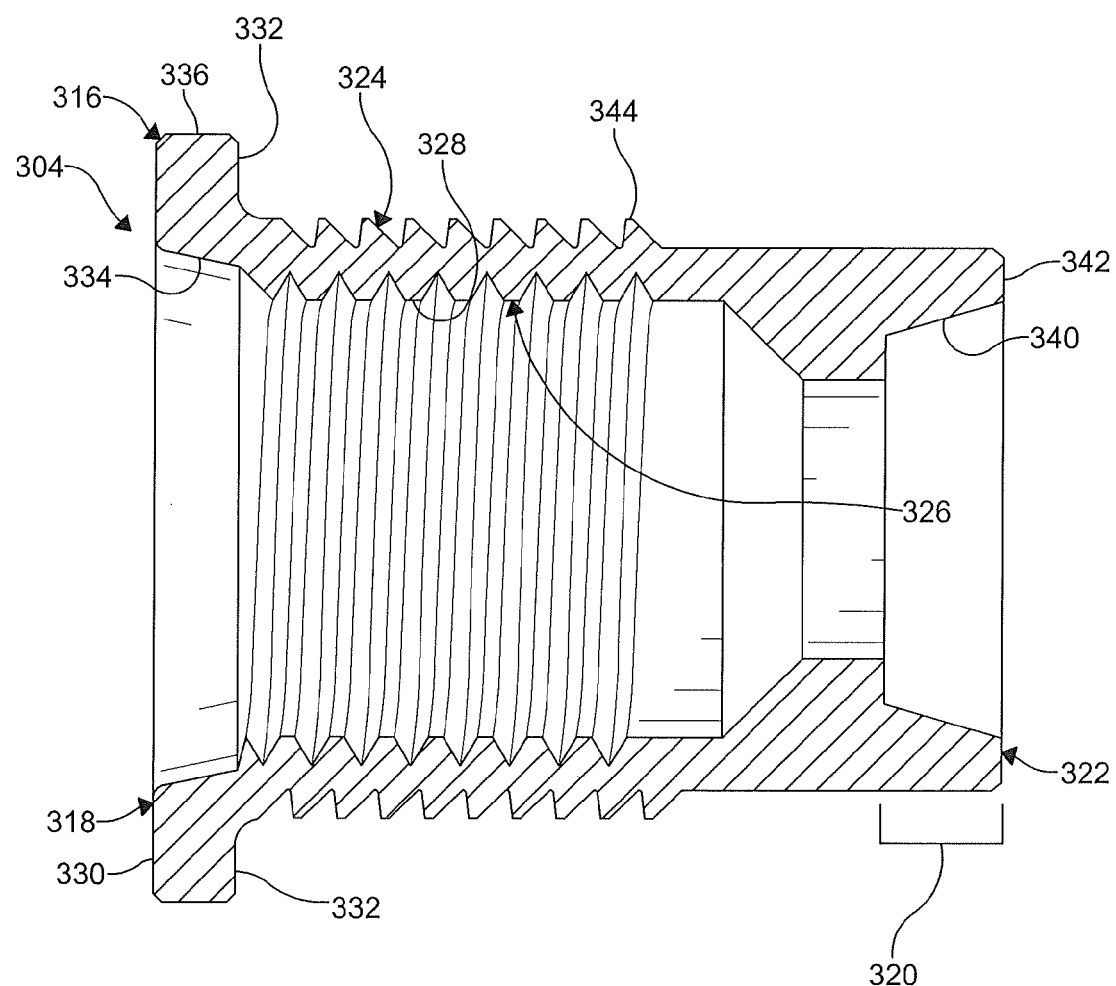
FIG. 16 is a cross-sectional view of the insert of FIG. 15 taken across line 16-16.
Figure 17:
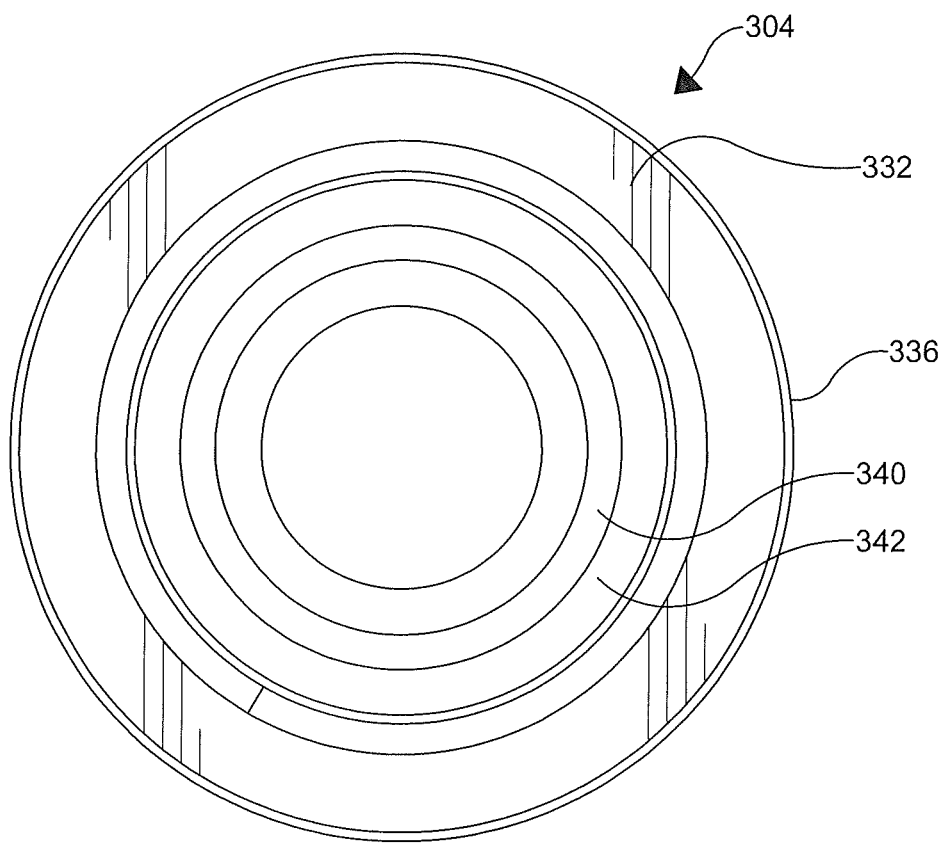
FIG. 17 is a bottom view of the insert of FIG. 13.

In an aspect, the insert 304 may extend much further into the housing 302 as compared to the fitting 106 as shown in FIG. 13. Additionally, the further extension of the insert 304 may result in locating the insert 304 in a thicker portion of the housing.

INDUSTRIAL APPLICABILITY

The disclosure is applicable to any fluid system, for example, systems that may be used in association with a machine, such as a machine having an internal combustion engine adapted to combust a fuel to release the chemical energy therein and convert that energy to mechanical power. The inserts 104, 204, 304 described herein may be mechanically coupled to any threaded port, bore, or orifice of any component. The inserts 104, 204, 304 may preserve the threads and port profile of the housing bore with about a 100,000 psi yield strength on the internal threads of the housing bore. Such an insert 104, 204, 304 minimizes stripping of the internal threads of the housing bore due to installation and removal of the fitting 106. The sealing feature 120, 220, 320 minimizes and may eliminate the need for an O-ring or elastomeric seal disposed between the insert 104, 204, 304 and the housing 102, 202, 302.

In operation, the housing 102, 202, 302 may be bored and threaded to accept the insert 104, 204, 304. An adhesive may be applied to the insert 104, 204, 304 and may be threaded into the housing 102, 202, 302. The fitting 106 may then be threaded into the insert 104, 204, 304. The fitting 106 may be removed and replaced as often as needed while minimizing the risk of stripping the threads in the insert 104, 204, 304 or the housing 102, 202, 302.

In an aspect, the insert 104, 204, 304 may extend much further into the housing 102, 202, 302 as compared to the fitting 106 providing greater strength due to the increased size of the insert 104, 204, 304. Additionally, the further extension of the insert 104, 204, 304 may result in locating the insert 104, 204, 304 in a thicker portion of the housing 102, 202, 302 resulting in a reduced likelihood of a failure of the housing 102, 202, 302. Moreover, the further extension of the insert 104, 204, 304 may result in spreading the load over a greater surface area resulting in a reduced likelihood of a failure of the housing 102, 202, 302. Finally, the further extension of the insert 104, 204, 304 may result in reduced likelihood of leakage.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein may be performed in any suitable order unless otherwise indicated herein or otherwise clearly contradicted by context.

We claim:

1. An insert for a hydraulic bore, the insert comprising:
an insert body defining a longitudinal axis, and including a first end, and a second end opposite the first end;
a flange formed adjacent the first end, the flange configured to contact an outer surface of a hydraulic component,
an annular sealing feature formed adjacent the second end, the sealing feature configured to form a seal, and
a cylindrical outer surface and a cylindrical inner surface extending between the first end and the second end, the cylindrical outer surface having an external buttress thread to engage threads on the hydraulic component,
the sealing feature further including a concave inner curved surface adjacent to the second end, and a convex outer curved surface that is positioned opposite to the concave inner curved surface and extends from the external buttress thread to the second end, and the concave inner curved surface and the convex outer curved surface together forming a taper that narrows toward the second end,
the convex outer curved surface forming a first slope in a radially outward to radially inward direction at a first location adjacent to the external buttress thread, and a second slope in the radially outward to radially inward direction at a second location adjacent to the second end, and wherein the second slope is steeper than the first slope, and
the cylindrical inner surface and the cylindrical outer surface forming a radial thickness relative to the longitudinal axis, and the annular sealing feature being contained entirely within the radial thickness.

2. The insert of claim 1, wherein the insert is formed from a high tensile steel material.

3. The insert of claim 1, wherein the sealing feature comprises a compression interface.

4. The insert of claim 3, wherein the compression interface comprises the convex outer curved surface, the concave inner curved surface, and a bottom interface surface.

5. The insert of claim 1, wherein the insert has an insert bore formed therethrough, the insert bore defined by an inner surface having an internal thread formed thereon.

6. A hydraulic system having the insert of claim 1, wherein the system comprises the hydraulic component including a housing that has an annular channel formed therein to receive the sealing feature of the insert.

7. A hydraulic system comprising:
a housing having a housing bore defined by a bore inner surface, wherein the bore inner surface has an internal thread formed thereon; and
an insert having an insert body defining a longitudinal axis, and including a first end, and a second end opposite the first end, and having a flange formed adjacent the first end, an annular sealing feature formed adjacent the second end, and a cylindrical outer surface and a cylindrical inner surface extending between the first end and the second end, the cylindrical outer surface having an external buttress thread configured to mesh with the internal thread of the housing bore, wherein the sealing feature and the flange are configured to interface with the housing to provide a fluid seal, the sealing feature further including a concave inner curved surface adjacent to the second end, and a convex outer curved surface that is positioned opposite to the concave inner curved surface and extends from the external buttress thread to the second end, and the concave inner curved surface and the convex outer curved surface together forming a taper that narrows toward the second end, the convex outer curved surface forming a first slope in a radially outward to radially inward direction at a first location adjacent to the external buttress thread, and a second slope in the radially outward to radially inward direction at a second location adjacent to the second end, and wherein the second slope is steeper than the first slope, and the cylindrical inner surface and the cylindrical outer surface forming a radial thickness relative to the longitudinal axis, and the annular sealing feature being contained entirely within the radial thickness.

8. The hydraulic system of claim 7, wherein the housing bore is a hydraulic port.

9. The hydraulic system of claim 7, wherein the housing is part of a high pressure pump.

10. The hydraulic system of claim 7, wherein the housing is formed from a low tensile material, and wherein the insert is formed from a high tensile material.

11. The hydraulic system of claim 7, wherein the sealing feature comprises a compression interface.

12. The hydraulic system of claim 7, wherein the housing has an annular channel formed therein to receive the sealing feature of the insert.

13. The hydraulic system of claim 7, wherein the insert has an insert bore formed therethrough, the insert bore defined by an inner surface having an internal thread formed thereon.

14. The hydraulic system of claim 13, further comprising a fitting having an external thread configured to mesh with the internal thread of the insert bore.

15. The hydraulic system of claim 14, further comprising an annular seal disposed between the fitting and the insert.

16. The hydraulic system of claim 15, wherein the annular seal is disposed adjacent an inner surface of the flange of the insert.

* * * * *